US007604199B2

(12) United States Patent
McMillan et al.

(10) Patent No.: US 7,604,199 B2
(45) Date of Patent: Oct. 20, 2009

(54) AEROFOIL CONTAINMENT STRUCTURE

(75) Inventors: Alison J McMillan, Uttoxeter (GB); Peter R Beckford, Derby (GB)

(73) Assignee: Rolls-Royce plc, London (GB)

( * ) Notice: Subject to any disclaimer, the term of this patent is extended or adjusted under 35 U.S.C. 154(b) by 487 days.

(21) Appl. No.: 11/305,206

(22) Filed: Dec. 19, 2005

(65) Prior Publication Data

US 2006/0165519 A1 Jul. 27, 2006

(30) Foreign Application Priority Data

Jan. 21, 2005 (GB) ................................ 0501284.4

(51) Int. Cl.
*F01D 5/20* (2006.01)
*B64D 33/00* (2006.01)

(52) U.S. Cl. ........................................ 244/53 R; 415/9

(58) Field of Classification Search ............... 244/53 R, 244/62; 60/766, 796; 415/9, 200, 197
See application file for complete search history.

(56) References Cited

U.S. PATENT DOCUMENTS 3,602,602 A * 8/1971 Motta ............................ 415/9
4,534,698 A * 8/1985 Tomich ......................... 415/9
5,388,959 A * 2/1995 Forrester et al. ......... 415/173.4
6,059,523 A * 5/2000 Modafferi et al. .............. 415/9

FOREIGN PATENT DOCUMENTS

EP 0 922 837 A 12/2000
GB 2 281 941 A 3/1995

* cited by examiner

*Primary Examiner*—Tien Dinh
(74) *Attorney, Agent, or Firm*—Jeffrey S. Melcher; Manelli Denison & Selter PLLC

(57) ABSTRACT

A stage of fan aerofoils (10) lies within a fan cowl (12). The fan duct (16) is defined in part by a hard casing (14) that in turn surrounds aerofoils (10). Hard casing (14) includes wedge members (26) that fill the annular gap between ring (14) and an outer ring (20). In the event of an aerofoil (10) breaking off, the hard ring (14) and wedges (26) absorb sufficient of the kinetic energy expended by the broken aerofoil (10), as to prevent it passing through outer ring (20) on to the fan cowl (12).

27 Claims, 4 Drawing Sheets

AEROFOIL CONTAINMENT STRUCTURE

FIELD OF THE INVENTION

The present invention relates to the containment of an aerofoil blade within a gas turbine engine should the aerofoil blade break from an associated disk during operational rotation thereof.

BACKGROUND OF THE INVENTION

There are many published examples of structures designed to achieve the above mentioned effect. One such example consists of a first, metal casing surrounding the stage of aerofoils, the metal casing itself being surrounded by an annular metal honeycomb structure, followed by a further metal casing surrounding the honeycomb structure, and followed again by multiple wrappings of a fibrous material such as Kevlar around the further metal casing.

A further example comprises a ring fitted in the first metal casing surrounding the stage of aerofoils, which ring, on being struck by a broken off aerofoil, is caused to rotate, thus absorbing the kinetic energy expended by the broken off aerofoil, to an extent that prevents the aerofoil puncturing the casing wall and exiting the engine.

All the known published art consists of assemblies of one piece members, each member being truly circular in form. The present invention seeks to provide an improved aerofoil containment structure.

SUMMARY OF THE INVENTION

According to the present invention an aerofoil containment structure comprises at least one annular casing having an axis and a major surface, a plurality of energy absorbable wedge members positioned around the major surface of the at least one annular casing, wherein adjacent wedge members being arranged in overlapping engagement with each other over at least a portion of their major surfaces.

BRIEF DESCRIPTION OF THE DRAWINGS

The invention will now be described, by way of example and with reference to the accompanying drawings, in which.

DETAILED DESCRIPTION OF THE INVENTION

Figure 1:
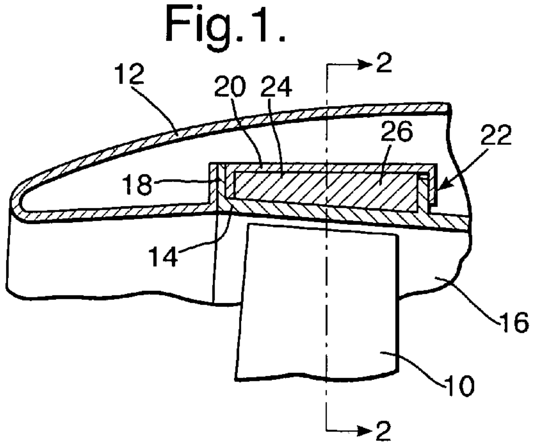
FIG. 1 is an axial cross sectional part view of a ducted fan of a ducted fan gas turbine engine including aerofoil containment structure in accordance with the present invention.

Referring to FIG. 1. A stage of fan aerofoils 10, only one of which is shown, lie within a fan cowl 12. The fan cowl 12 includes an inner generally cylindrical member, or inner casing, 14 that is made from a hard material, such as metal, or a ceramic, or a metal having a ceramic lining. Member 14 forms part of the fan flow duct 16, and is fastened to member 12 via flange 18. A further outer cylindrical member, or outer casing 20, also hard surrounds inner cylindrical member 14 in radially spaced relationship, and is connected thereto via further flanges 22, so as to define an annular space 24 therebetween. Space 24 is filled by wedges 26, examples of which are clearly illustrated in FIG. 2, to which reference is now made.

Figure 2:
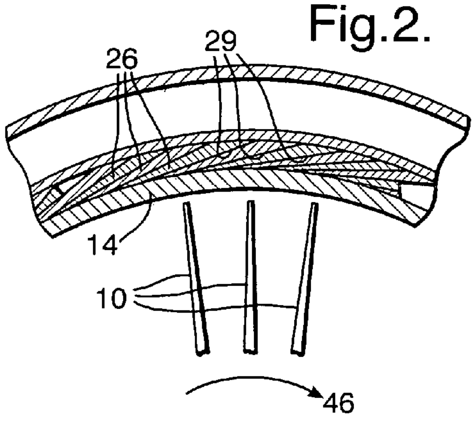
FIG. 2 is a view on line 2-2 of FIG. 1.

In the FIG. 2 example, wedges 26 have flat major surfaces 29, adjacent ones of which abut each other over their entire areas. They are tapered so as to enable each to be arranged around and tangential to, the outer surface of inner cylindrical member 14, in the major surface area abutting relationship as described hereinbefore. Their dimensions across space 24 are such as to ensure that they completely bridge space 24.

The wedge members 26 are rectangular in form in planes containing the axis of the inner and outer cylindrical members, or inner and outer casings, 14 and 20 and the wedge members 26 are tapered in form in planes normal to the axis of the inner or outer cylindrical members, or inner and outer casings, 14 and 20.

Wedges 26 may be made of a crushable metallic foam, or from different crushable metallic foams which would be arranged in an alternating manner around the inner cylindrical member 14. Alternatively, they could all be made from a common composite material, or from different composite materials which would be arranged in alternating manner around the inner cylindrical member 14. The composite material may comprise fibre reinforced organic matrix material for example carbon fibre reinforced epoxy resin, or glass fibre reinforced epoxy resin. The composite material may comprise hollow spheres.

Figure 3:
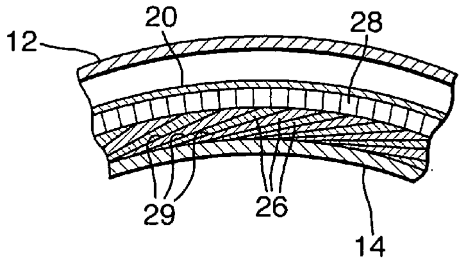
FIG. 3 depicts an alternative aerofoil containment structure in accordance with the present invention.

Referring to FIG. 3. In this example of the present invention, outer cylindrical member 20 has been increased in diameter so as to enable a circular, crushable metal honeycomb structure 28 to be provided between wedges 26 and outer cylindrical member, or outer casing 20.

Figure 4:
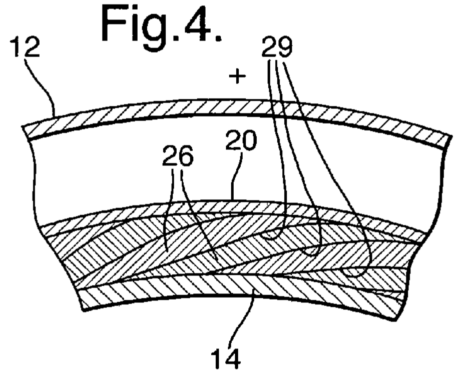
FIG. 4 is an enlarged view of FIG. 2 and depicts a further alternative aerofoil containment structure in accordance with the present invention.

Referring to FIG. 4. In this arrangement, wedges 26 are slightly serpentine in form, or as shown are doubly tapered, in planes normal to the axis of rotation of an associated engine (not shown), which effects an increase in their respective abutting surface areas. Further, though not shown, but if desired, a honeycomb structure of the kind described in connection with FIG. 3 could be incorporated in the FIG. 4 arrangement.

The interface contact between the major surfaces 29 of adjacent wedges 26 may be substituted by a bond, glue, or by a weld, or by interlocking features such as ribs and mating grooves, none of which are shown, but will be easily understood by the man skilled in the art, on reading this specification.

Should an aerofoil blade break free from its rotating disk, its direction of movement has a large tangential component, which results in the aerofoil striking the surrounding inner ring member, or inner casing, 14 at a point beyond its rotational position when it broke free. At that first contact between aerofoil and inner ring member, or inner casing, 14 the latter tends to rotate through a small arc and, depending on the orientation of wedges 26 relative to the direction of the small rotation, wedges 26 will either be stretched or compressed. Thus, the first contact followed by part rotation, followed by stretching or compression of the wedges 26, provides three means to effect some absorption of the kinetic energy possessed by the aerofoil.

On impact of the broken aerofoil on inner ring member, or inner casing, 14, a shock wave is transmitted through and around the inner surface of inner ring member, or inner casing, 14. Other shock waves will also propagate into wedges 26, the properties of which are such as to repeatedly reflect them. Where the reflected shock waves start at a high angle of incidence at the tip of a wedge 26, they are ejected therefrom at an angle almost normal to their ends.

Some shock waves will be refracted into adjacent wedges 26, whereupon there will occur the process of conversion of tangential motion at the inner ring member, or inner casing, 14 to radial motion thereof along a significant sector of outer ring member or outer casing 20. If, as in FIG. 3, a layer of honeycomb 28 surrounds outer ring member, or outer casing, 20, the radial motion will be in the appropriate direction to crush it. Moreover, where as is described hereinbefore, shock waves pass from wedge to wedge, they would fail the joints between the major surfaces 29 of adjacent wedges 26, thus losing energy as they did so.

Referring again to impact of broken aerofoil 10 with inner ring member, or inner casing, 14. Inner ring member, or inner casing, 14 will be punctured. Broken aerofoil 10 will then impact on, and penetrate, several wedges 26, which then slip relative to each other, and the resulting friction absorbs more energy. The movement also restrains the motion of broken aerofoil 10. Further, as the wedges 26 slip, the circle they define increases in diameter within its elastic limit, thus causing the full circumference of outer ring member, or outer casing, 20 to stretch rather than merely permanently bulge locally in the area of impact, as happens in prior art arrangements. The elastically absorbed energy is then released back into the wedges 26 and causes them to slip again, but in the opposite direction, thus creating more friction, and thereby dissipating more energy.

Figure 5:
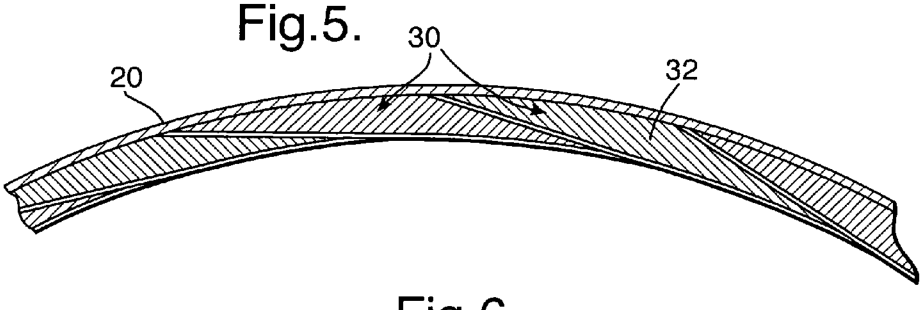
FIG. 5 depicts a third alternative aerofoil containment structure in accordance with the present invention.

Referring now to FIG. 5, in which ring member, or casing, 20 contains wedges 30, which differ from wedges 26 in both construction and form. Wedges 30 are attached to the inner surface of ring member, or casing, 20, such that their adjacent ends overlap. Their shapes and proportions are such that their radially inner surfaces combine to define an axial portion of the fan duct, thus obviating inner ring member, or inner casing 14 in FIGS. 1 to 4.

Figure 6:
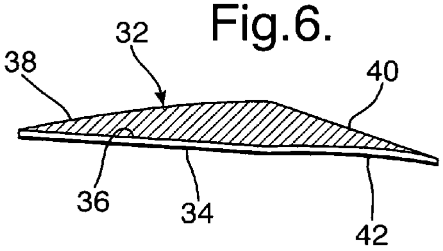
FIG. 6 depicts a single wedge of the kind incorporated in the example in FIG. 5.

Referring to FIG. 6. Wedges 30 consist of moulded metal foam 32 having a thin hard metal skin 34 attached to a surface 36. The skins 34, when wedges 30 are in situ in a fan duct, will be the parts exposed to the duct airflow.

Referring back to FIG. 5. Each wedge 30 is attached via a convex curved surface portion 38 formed on its metallic foam, to the inner surface of ring member, or casing, 20. A flat portion 40 extends from portion 38 at an angle having a small component radially inward of ring member, or casing, 20. Skin 34 attached thereto has a concave curve 42 corresponding in form to ring member, or casing, 20 in the opposing end portion of wedge 30. A wedge shaped space is thus defined between ring member, or casing, 20 and flat portion 40. The next wedge 30 is inserted in that space with its curved portion 38 engaging the inner surface of ring member, or casing, 20, so that the skin 34 on one wedge overlaps and abuts the metallic foam 32 on the wedge 26 adjacent thereto. Assembly of the wedges 30 is continued in this manner around the inside periphery of ring member, or casing, 20, until the ring of wedges is complete. By this means, a ring is provided that corresponds to, and obviates, ring member 14 of FIGS. 1 to 4. There results a considerably lighter structure.

Figure 7:
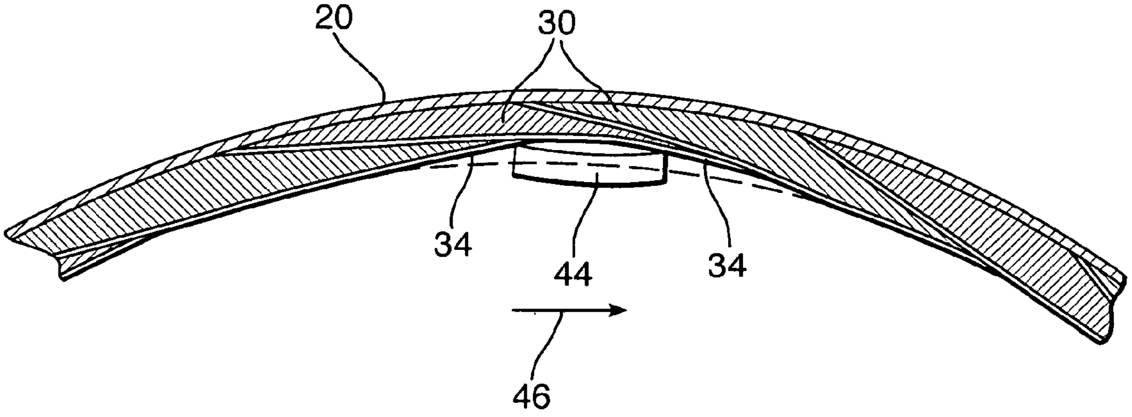
FIG. 7 illustrates contact between the root of a broken off fan aerofoil of the kind depicted in FIG. 1.

Referring to FIG. 7 An aerofoil (not shown in FIG. 7) has broken away from a disk (not shown) and its root 44 has collided with the skins 34 of adjacent wedges 30. The energy expended by the collision has forced the skins radially outwardly towards ring member, or casing, 20, causing local crushing of the metallic foam 32.

Figure 8:
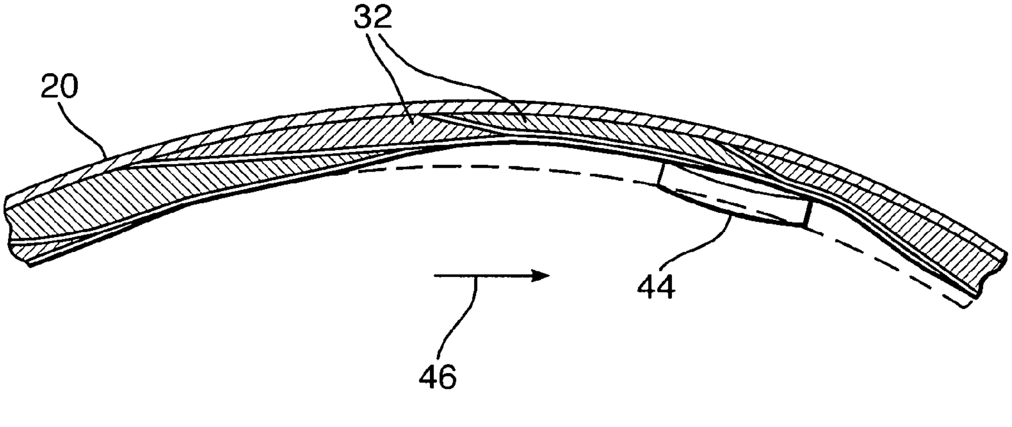
FIG. 8 illustrates maximum crushing effect of the aerofoil root of FIG. 7 in a direction radial to the axis of rotation of the aerofoil stage.

Referring now to FIG. 8. Root 44 continues round the fan duct in the direction of rotation of the fan, indicated by arrow 46, crushing more metallic foam 32 in its path and expending more energy. As is seen in the drawings, the overlap of the wedges 30 is in the direction of fan rotation, which avoids separation of the wedges 30 in the overlap area by the dragging effect of the root 44. The formation of a path through which root 44 could pass and rupture ring member, or casing, 20 is thus prevented. Rather, the crushing action presses the overlapping skins 34 closer together along more of their lengths, thereby providing an extended double skin.

As crushing of the metallic foam 32 occurs, the metallic foam 32 absorbs some of the impact energy and distributes the load so generated more evenly into and around ring member, or casing, 20. This allows ring member, or casing, 20 to expand until the metallic foam 32 reaches maximum densification. The resulting increase in diameter of ring member, or casing, 20 reduces the potential for interference with the orbit of the now unbalanced fan rotor.

Ring member, or casing, 20 may be made thinner than prior art components corresponding thereto because the arrangement of the present invention prevents direct impact by the root 44 or any other aerofoil portion thereon. Moreover, as wedges 30 work in compression i.e. broken off pieces press them against ring member, or casing 20, it is unlikely that any will be dislodged, and any that are damaged can easily be replaced.

Figure 9:
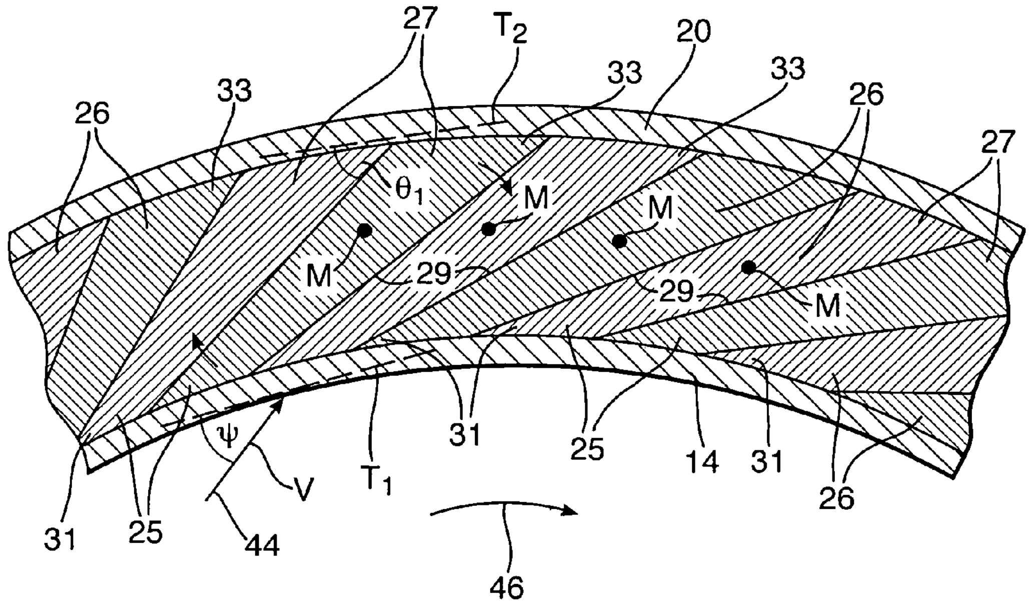
FIG. 9 is an enlarged view on line 2-2 of FIG. 1.

An aerofoil containment structure according to the present invention shown in FIG. 9, and is similar to that shown in FIG. 2. In this arrangement of the aerofoil containment structure the wedges 26 are arranged, as in FIG. 2, FIG. 3 and FIG. 4, such that the radially outer ends 27 of the wedges 26 are spaced circumferentially, or angularly, from the radially inner ends 25 of the wedges 26 in the direction of rotation of the disk and aerofoil, indicated by arrow 46. It is to be noted that a root 44 of a detached aerofoil would strike the inner surface of the inner ring member, or inner casing, 14 at an angle $\psi$ measured between a plane $T_1$ tangential to the inner ring member 14 at the impact point and the root 44 momentum vector V at the instant of impact. The angle $\theta$ measured between a plane $T_2$ tangential to the outer ring member, or outer casing, 20 and a major surface 29 of a wedge 26, extending between the outer ring member 20 and the inner ring member 14 is less than $\psi$. The impact of the root 44 induces a rotation couple about the centre of mass M of the wedges 26. The rotation of the wedges 26 directs the pointed portions 31 and 33 at the radially inner ends 25 and radially outer ends 27 respectively away from piercing the ring members 14 and 20 respectively. The impact energy of the root 44 of the aerofoil is dissipated by deformation or failure of the bonds/joins between the interfaces of the wedges 26, e.g. the radially inner ends 25 and radially outer ends 27, and the ring members 14 and 20 as they are pulled apart. The impact energy of the root 44 of the aerofoil is also dissipated through friction/traction forces between the interfaces on the major surfaces 29 of adjacent wedges 26 and/or by failure of bonds/ joins between the interfaces on the major surfaces 29 of adjacent wedges 26. The shearing action of the wedges 26 leads to stretching of the ring members 14 and 20, and the ring members 14 and 20 have high hoop stress and so are able to absorb more impact energy. Angle ψ is typically 10 to 40° and so θ is generally less than 40° and may be less than 10°.

A further alternative aerofoil containment structure according to the present invention is shown in FIG. 2. In this arrangement of the aerofoil containment structure the wedges 26 are arranged as in FIGS. 5 to 8, such that the radially outer ends 27 of the wedges 26 are spaced circumferentially, or angularly, from the radially inner ends 25 of the wedges 26 in the direction opposite to the direction of rotation of the disc and aerofoils. It is to be noted that a root 44 of a detached aerofoil would strike the inner surface of the inner ring member, or inner casing, 14 at an angle ψ measured between a plane $T_1$ tangential to the inner ring member 14 at the impact point and the root 44 momentum vector V at the instant of impact. The angle $\theta_2$ measured between a plane $T_3$ tangential to the outer ring member, or outer casing, 20 and a major surface 29 of a wedge 26, extending between the outer ring member 20 and the inner ring member 14 is greater than 90° and less than 180°. The impact of the root 44 pushes radially outwardly on the radially inner end 25 of the wedges 26. The impact energy of the root 44 of the aerofoil is dissipated by facture of the bonds/joins between the interfaces of the wedges 26, e.g. the radially inner ends 25 and the ring member 14. The impact energy of the root 44 of the aerofoil is also dissipated through friction/traction forces between the interfaces on the major surfaces 29 of adjacent wedges 26 and/or by facture of bonds/joins between the interfaces on the major surfaces 29 of adjacent wedges 26. The shearing action of the wedges 26 leads to stretching of the ring members 14 and 20, and the ring members 14 and 20 have high hoop stress and so are able to absorb more impact energy. The arrangement of the wedges 26 also allows the root 44 of the aerofoil to become lodged between the radially inner ends 25 of the wedges 26 and the inner ring member 14.

Figure 10:
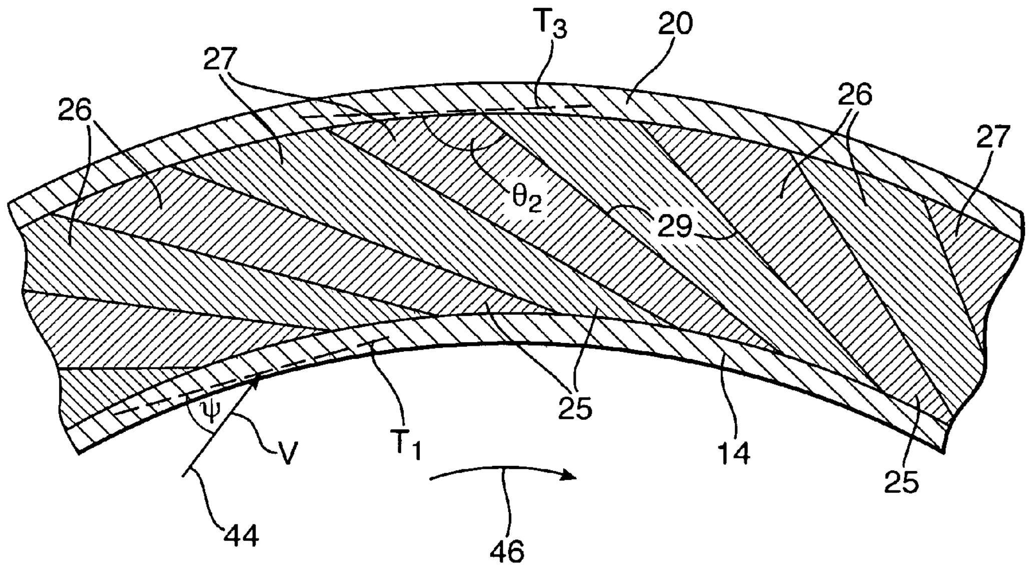
FIG. 10 is an enlarged view on line 2-2 of FIG. 1 and depicts a further alternative aerofoil containment structure in accordance with the present invention.
Figure 11:
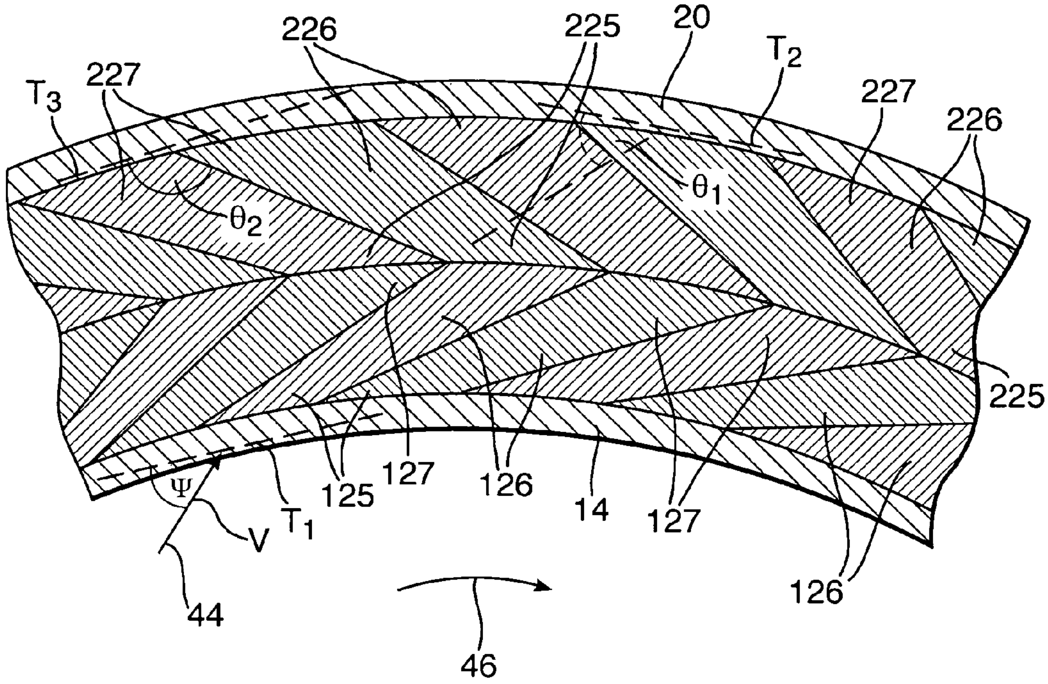
FIG. 11 is an enlarged view on line 2-2 of FIG. 1 and depicts another alternative aerofoil containment structure in accordance with the present invention.

Another alternative aerofoil containment structure according to the present invention is shown in FIG. 11. In this arrangement of the aerofoil containment structure there are two sets of wedges, a radially inner set of wedges 126 and a radially outer set of wedges 226 arranged radially between the inner cylindrical member, or inner casing, 14 and the outer cylindrical member or outer casing 20. The radially inner set of wedges 226 are arranged such that the radially outer ends 127 of the wedges 126 are spaced circumferentially, or angularly, from the radially inner ends 125 of the wedges 126 in the direction of rotation of the disc and aerofoils, indicated by arrow 46. The radially outer set of wedges 226 are arranged such that the radially outer ends 227 of the wedges 226 are spaced circumferentially, or angularly, from the radially inner ends 225 of the wedges 226 in the direction opposite to the direction of rotation 46 of the disc and aerofoils. It is to be noted that a root 44 of a detached aerofoil would strike the inner surface of the inner ring member 14 at an angle ψ measured between a plane $T_4$ tangential to the inner ring member 44 at the impact point and the root 44 momentum vector V at the instant of impact. This aerofoil containment structure is thus a combination of the arrangement of the wedges in FIGS. 9 and 10, with the wedges in FIG. 10 being arranged radially outwardly of the wedges of FIG. 9. This allows the root 44 of the detached aerofoil to become lodged between the radially inner ends 225 of the wedges 226 and the radially outer ends 127 of the wedges 126. This aerofoil containment structure absorbs the impact energy of the root 44 of the aerofoil by the combination of the impact energy dissipation of the wedges 126 and the impact energy dissipation of the wedges 226 as described for wedges 25 with references to FIGS. 9 and 10 respectively.

The outer cylindrical member, or outer casing, 20 is preferably a metal, for example steel, titanium, aluminium, aluminium alloy, nickel, nickel alloy, titanium alloy. The outer cylindrical member 20 may have radially inwardly and/or radially outwardly extending circumferentially extending ribs to stiffen and to reinforce the outer cylindrically member 20. In addition it may be possible to provide wrappings of a woven fibrous material, such as Kevlar, around the outer cylindrical member 20. The inner cylindrical member, or inner casing, 14 is preferably a metal, for example steel, titanium, aluminium, aluminium alloy, nickel, nickel alloy, titanium alloy. A ceramic lining applied to the inner surface of the inner cylindrical member 14 is preferably tungsten carbide or diamond.

If the wedges are composite wedges they may have fibres and/or particles, which are abrasive so as to abrade, tear and/or saw a detached aerofoil trapped between adjacent wedges as the wedges move backwards and forwards along their interfaces on the sides of the wedges.

The wedges in FIG. 5 comprise a skin sufficiently tough to prevent penetration and preferably comprises steel or other suitable metal eg nickel, nickel alloy, titanium, titanium alloy. The foam has sufficient crush strength to reach maximum compression with the greatest predicted impact energy and preferably the foam comprises a metal foam, but other suitable foams may be used.

The typical angle ψ is generally between 10° and 40°. The outer member and/or the inner member may be frusto conical and the outer member and the inner member are outer and inner annular casings respectively. The present invention is applicable to fan aerofoils and may also be applicable to compressor aerofoils and turbine aerofoils.

We claim:

1. An aerofoil containment structure comprising at least one annular casing having an axis and a surface, a plurality of separate energy absorbable wedge members being positioned circumferentially around the surface of the at least one annular casing, said each wedge member having a major surface, said wedge members being tapered in a plane normal to the axis of the at least one annular casing, wherein circumferentially adjacent wedge members are arranged in overlapping engagement with each other over at least a portion of their major surface.

2. An aerofoil containment structure as claimed in claim 1 comprising an inner casing and an outer casing, the inner casing being co-axially nested within the outer casing, and separated therefrom by said wedge members.

3. An aerofoil containment structure as claimed in claim 2 wherein said wedge members are serpentine in profile in planes normal to the axis of said casings.

4. An aerofoil containment structure as claimed in claim 2 wherein said wedge members are constructed from a metallic foam.

5. An aerofoil containment structure as claimed in claim 2 wherein the radially outer ends of the wedge members are spaced circumferentially from the radially inner ends of the wedge members in a direction opposite to the direction of rotation of the aerofoil.

6. An aerofoil containment structure as claimed in claim 5 wherein an angle between a plane tangential to the outer casing and the major surfaces of the wedge members is greater than 90° and less than 180°.

7. An aerofoil containment structure as claimed in claim 2 wherein there is a radially inner set of wedge members and a radially outer set of wedge members arranged between the inner casing and the outer casing.

8. An aerofoil containment structure as claimed in claim 7 wherein the radially outer ends of the radially inner set of wedge members are spaced circumferentially from the radially inner ends of the radially inner set of wedge members in the direction of rotation of the aerofoil and the radially outer ends of the radially outer set of wedge members are spaced circumferentially from the radially inner ends of the radially outer set of wedge members in a direction opposite to the direction of rotation of the aerofoil.

9. An aerofoil containment structure as claimed in claim 8 wherein an angle between a plane tangential to the outer casing and the major surfaces of the wedge members of the radially inner set of wedge members is less than 40° and an angle between a plane tangential to the outer casing and the major surfaces of the wedge members of the radially outer set off wedge members is greater than 90° and less than 180°.

10. An aerofoil containment structure as claimed in claim 1 wherein said wedge members are rectangular in form in planes containing the axis of said at least one annular casing.

11. An aerofoil containment structure as claimed in claim 1 including an annular honeycomb member sandwiched between the outer casing and the wedge members.

12. An aerofoil containment structure as claimed in claim 1 wherein said wedge members are constructed from a composite material.

13. An aerofoil containment structure as claimed in claim 12 wherein said composite material comprises a fibre reinforced organic matrix material.

14. An aerofoil containment structure as claimed in claim 13 wherein the composite material further includes hollow spheres.

15. An aerofoil containment structure as claimed in claim 1 consisting of a single casing having an inside surface, a plurality of wedge members being arranged around the inside surface of the single casing, each wedge member overlapping the proceeding wedge member and being overlapped by the preceding wedge member.

16. An aerofoil containment structure as claimed in claim 15 wherein each wedge member comprises a moulded foam having one surface shaped to conform to the curvature of the inner surface of said single casing so as to fit thereto, and includes a skin of hard material on an opposing surface, which skin, in situ in an engine, will closely surround a stage of rotor aerofoils.

17. An aerofoil containment structure as claimed in claim 16 wherein each wedge member comprises a moulded metallic foam and a skin of hard metal.

18. An aerofoil containment structure as claimed in claim 17 wherein each wedge member comprises a steel skin.

19. An aerofoil containment structure as claimed in claim 1 wherein the aerofoil is a fan aerofoil.

20. An aerofoil containment structure as claimed in claim 1 wherein the radially outer ends of the wedge members are spaced circumferentially from the radially inner ends of the wedge members.

21. An aerofoil containment structure comprising at least one annular casing having an axis and a major surface, a plurality of energy absorbable wedge members being positioned around the major surface of the at least one annular casing, wherein adjacent wedge members being arranged in overlapping engagement with each other over at least a portion of their major surfaces wherein said aerofoil containment structure comprises an inner casing and an outer casing, said inner casing being co-axially nested within the outer casing, and separated therefrom by said wedge members and wherein said wedge members are arranged in attitudes having at least a substantial tangential component of direction relative to said inner casing.

22. An aerofoil containment structure comprising at least one annular casing having an axis and a major surface, a plurality of energy absorbable wedge members being positioned around the major surface of the at least one annular casing, wherein adjacent wedge members being arranged in overlapping engagement with each other over at least a portion of their major surfaces wherein said aerofoil containment structure comprises an inner casing and an outer casing, said inner casing being co-axially nested within the outer casing, and separated therefrom by said wedge members and wherein said wedge members narrow towards those ends thereof that locate on the inner casing.

23. An aerofoil containment structure comprising at least one annular casing having an axis and a major surface, a plurality of energy absorbable wedge members being positioned around the major surface of the at least one annular casing, wherein adjacent wedge members are arranged in overlapping engagement with each other over at least a portion of their maior surface and wherein the overlapping engagement of said wedge members is achieved by bonding.

24. An aerofoil containment structure comprising at least one annular casing having an axis and a major surface, a plurality of energy absorbable wedge members being positioned around the major surface of the at least one annular casing, wherein adjacent wedge members are arranged in overlapping engagement with each other over at least a portion of their major surface and wherein the overlapping engagement of said wedge members is achieved by welding.

25. An aerofoil containment structure comprising at least one annular casing having an axis and a major surface, a plurality of energy absorbable wedge members being positioned around the major surface of the at least one annular casing, wherein adjacent wedge members are arranged in overlapping engagement with each other over at least a portion of their major surface and wherein each wedge member differs in composition from the next adjacent wedge member.

26. An aerofoil containment structure comprising at least one annular casing having an axis and a major surface, a plurality of energy absorbable wedge members being positioned around the major surface of the at least one annular casing, wherein adjacent wedge members being arranged in overlapping engagement with each other over at least a portion of their major surfaces wherein said aerofoil containment structure comprises an inner casing and an outer casing, said inner casing being co-axially nested within the outer casing, and separated therefrom by said wedge members and wherein the radially outer ends of the wedge members are spaced circumferentially from the radially inner ends of the wedge members in the direction of rotation of the aerofoil.

27. An aerofoil containment structure as claimed in claim 26 wherein an angle between a plane tangential to the outer casing and the major surfaces of the wedge members is less than 40°.

* * * * *

UNITED STATES PATENT AND TRADEMARK OFFICE

CERTIFICATE OF CORRECTION

PATENT NO. : 7,604,199 B2
APPLICATION NO. : 11/305206
DATED : October 20, 2009
INVENTOR(S) : McMillan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Fifth Day of October, 2010

David J. Kappos

*Director of the United States Patent and Trademark Office*